J. E. Lobdell.
Horse Hay-Fork.
N° 75282. Patented Mar. 10, 1868.
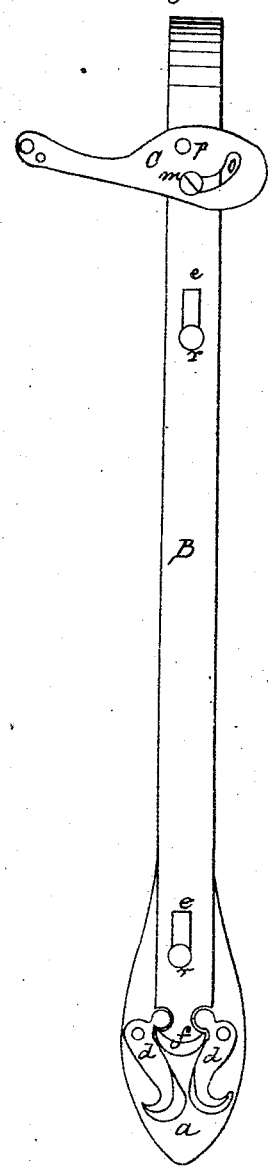
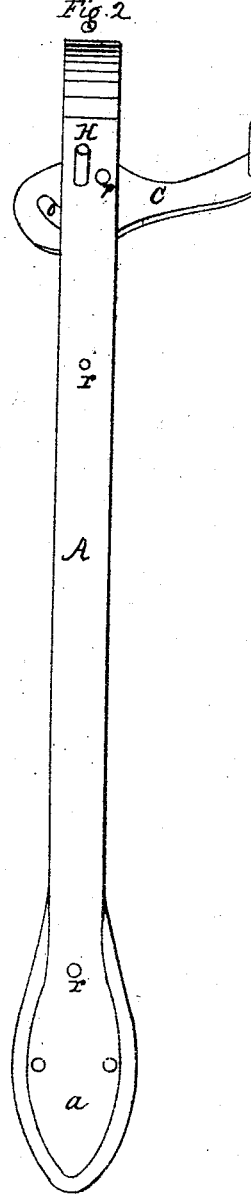
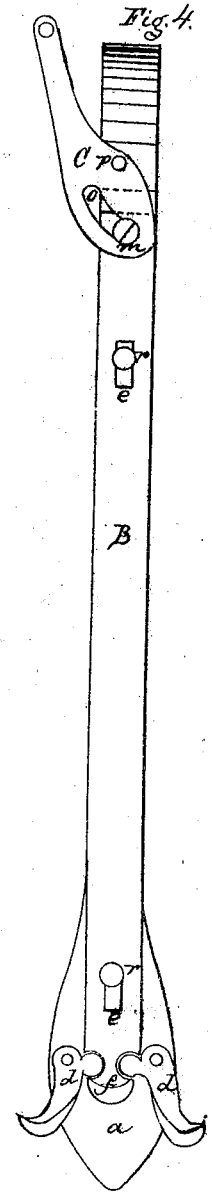
Witnesses
R. F. Lobdell
H. F. Lusk
Inventor
Jas. E. Lobdell

United States Patent Office.

JAMES E. LOBDELL, OF CENTRE LISLE, NEW YORK.

Letters Patent No. 75,282, dated March 10, 1868.

IMPROVEMENT IN HORSE HAY-FORKS.

The Schedule referred to in these Letters Patent and making part of the same.

TO ALL WHOM IT MAY CONCERN:

Be it known that I, JAMES E. LOBDELL, of Centre Lisle, in the county of Broome, and State of New York, have invented a new and useful Improvement in Horse Hay-Forks, or Elevators and Hay-Knife combined; and I do hereby declare that the following is a full, clear, and exact description of the same, reference being had to the accompanying drawings, making a part of this specification, in which—

Figure 1 represents a front view of the knife and fork, the fork being closed or in position for being inserted into the hay.

Figure 2 represents the reverse side, showing the back side of the main cutter-bar.

Figure 3 is a longitudinal section, showing the shape of main cutter-bar and slide-bar.

Figure 4 represents the fork, open or in position for elevating its load, or for use as a knife for cutting down through hay in the mow or stack.

My invention consists in combining with the main cutting-bar and blade a slide-bar with knuckle-head, which operates the elevating-hooks or cutters by means of a double knuckle-joint, which slide-bar is itself operated by an eccentric-latch or adjuster.

Similar letters of reference refer to corresponding parts in all the figures.

A is the main bar, with cutting-blade $a$, the lower end being dagger-shaped, and edges bevelled on back side, as shown in fig. 2, the upper end being looped for the purpose of attaching the hoisting rope, and having the pin H for a handle, and the rivets $r\ r$, by which to attach the slide-bar. B is the slide-bar, having the slots $e\ e$ and knuckle-head $f$, which operates the prongs or cutters $d\ d$. C is the eccentric-latch or adjuster, which is pivoted to the main cutting-bar at $p$, and operates the slide-bar B by means of the eccentric-slot $o$, working on the pin $m$ in the slide-bar. The hooks or cutters $d\ d$ are pivoted to the blade $a$ so as to fit the knucle-head $f$, and are so formed as to serve as knives or shears to cut the hay, and when spread out serve as hooks or elevators; the upper curved edges being flat, and the lower edges sharpened, with the bevel outward, so that when closed they will fit closely to the face of the cutting-blade $a$. The lower edge of the knuckle-head $f$ is also bevelled on the outside.

The operation is as follows: The fork being closed, as shown in fig. 1, is thrust down into the hay to the desired depth, when, by hoisting the latch or adjuster $c$, the prongs $d\ d$ are thrown outward into the position shown in fig. 2, in which position they are ready to carry up with them the hay with which they come in contact. The load is then elevated by the usual or ordinary means, and is guided by cord or rope until it reaches the required position to be deposited, when, by lowering the latch C, the hay is released. For cutting down a mow or stack, the hooks or cutters $d\ d$ can be spread out, and will cut much faster in that way.

This fork, I claim, is more compact, making it stronger and less liable to get out of order, than any other cutting-fork. It is easier adjusted, better balanced, and the latch is so arranged that it takes up less room, consequently the fork may be made shorter than other similar forks, making it cost less. While the fork is being lifted the latch is thrown upward out of the way, so that it is not liable to hold a portion of the hay in unloading, which is an objection with some forks. It will be observed that when the fork is ready to be thrust into the hay, the lower end of the slide-bar, the knuckle-joint, and cutting-hooks, all fit closely to the face of the cutting-blade of the main bar A, so that there are no projecting corners or points to prevent a free, smooth entrance into the hay.

Having thus described the construction and operation of my improved hay-fork, what I claim as my invention, and desire to secure by Letters Patent, is—

1. The sliding bar B with knuckle-head $f$ and slots $e\ e$, when used in combination with the main bar A and hooks or prongs $d\ d$, substantially as set forth.

2. The arrangement and combination of the main cutting-bar and blade A, slide-bar B, latch $c$, and cutting-hooks $d\ d$, substantially as and for the purposes set forth.

JAS. E. LOBDELL.

Witnesses:
B. F. LOBDELL,
K. F. LUSK.